United States Patent [19]
Lin et al.

[11] Patent Number: 5,790,044
[45] Date of Patent: Aug. 4, 1998

[54] METHOD AND APPARATUS FOR REDUCING A PROCESSING DELAY IN A TWO-WAY MESSAGING SYSTEM

[75] Inventors: Jyh-Han Lin, Fort Worth; Pavan Jyotsna Achyutuni, North Richland Hills; Sachin Waman Danait, Irving, all of Tex.

[73] Assignee: Motorola, Inc., Schaumburg, Ill.

[21] Appl. No.: 680,079

[22] Filed: Jul. 15, 1996

[51] Int. Cl.$^6$ ...................................................... H04Q 1/00
[52] U.S. Cl. ............................... 340/825.44; 395/200.32
[58] Field of Search .................. 340/825.44, 825.42, 340/825.28, 825.29; 395/200.32

[56] References Cited

U.S. PATENT DOCUMENTS 4,875,038  10/1989  Siwiak et al. ...................... 340/825.44
5,153,582  10/1992  Davis ................................ 340/825.44

*Primary Examiner*—Brian Zimmerman
*Attorney, Agent, or Firm*—R. Louis Breeden

[57] ABSTRACT

Delay in processing an interactive application for a portable subscriber unit (216) is reduced in a two-way messaging system (200) having a distributed architecture including a plurality of intelligent control elements (202, 204, 208, 212, 214, 216). A software messaging agent (210) is shipped (408) from a first one of the plurality of intelligent control elements to a second one of the plurality of intelligent control elements, the second one requiring less communication among the plurality of intelligent control elements to process the interactive application than required by the first one. Thereafter the software messaging agent operates (410) in the second one of the plurality of intelligent control elements for autonomously processing at least a portion of the interactive application, thereby reducing processing delay resulting from communication latency.

17 Claims, 5 Drawing Sheets

100

200

208

400

METHOD AND APPARATUS FOR REDUCING A PROCESSING DELAY IN A TWO-WAY MESSAGING SYSTEM

FIELD OF THE INVENTION

This invention relates in general to communication systems, and more specifically to a method and apparatus for reducing a processing delay in a two-way messaging system.

BACKGROUND OF THE INVENTION

The conventional two-way messaging system is geared toward non-real-time applications due to relatively long round-trip communication delays between portable subscriber units and the fixed portions of the system. For example, a request from a portable subscriber unit may first be sent to a base station receiver, from which it is then sent to a base station controller, which then sends the request to a messaging control center. The messaging control center may then have to access a host computer for servicing the request. The response then has to be sent back through the messaging control center, the base station controller, and a base station transmitter, and thence to the portable subscriber unit. As the request and the response are competing with other communication traffic on each leg of the round trip, substantial delays, e.g., tens of seconds or even minutes, can accumulate between the request origination and the response completion. Such delays can prohibit applications that require multiple end-to-end interactions.

Thus, what is needed is a method and apparatus that can reduce the round-trip communication delays inherent in prior art two-way messaging systems. An arrangement that is sufficiently fast to allow applications that require multiple end-to-end interactions would be highly desirable.

SUMMARY OF THE INVENTION

An aspect of the present invention is a method of reducing a delay in processing an interactive application for a portable subscriber unit in a two-way messaging system having a distributed architecture including a plurality of intelligent control elements. The method comprises the steps of shipping a software messaging agent from a first one of the plurality of intelligent control elements to a second one of the plurality of intelligent control elements, the second one requiring less communication among the plurality of intelligent control elements to process the interactive application than required by the first one; and thereafter operating the software messaging agent in the second one of the plurality of intelligent control elements for autonomously processing at least a portion of the interactive application, thereby reducing processing delay resulting from communication latency.

Another aspect of the present invention is a two-way messaging system for reducing a delay in processing an interactive application for a portable subscriber unit, the system having a distributed architecture. The system comprises a plurality of intelligent control elements selected from a group consisting of a host computer, a messaging control center, a base station controller, a base station transmitter, a base station receiver, and the portable subscriber unit. The plurality of intelligent control elements are programmed to ship a software messaging agent from a first one of the plurality of intelligent control elements to a second one of the plurality of intelligent control elements, the second one requiring less communication among the plurality of intelligent control elements to process the interactive application than required by the first one; and operate the software messaging agent in the second one of the plurality of intelligent control elements for autonomously processing at least a portion of the interactive application, thereby reducing processing delay resulting from communication latency.

DESCRIPTION OF THE PREFERRED EMBODIMENT

Figure 1:
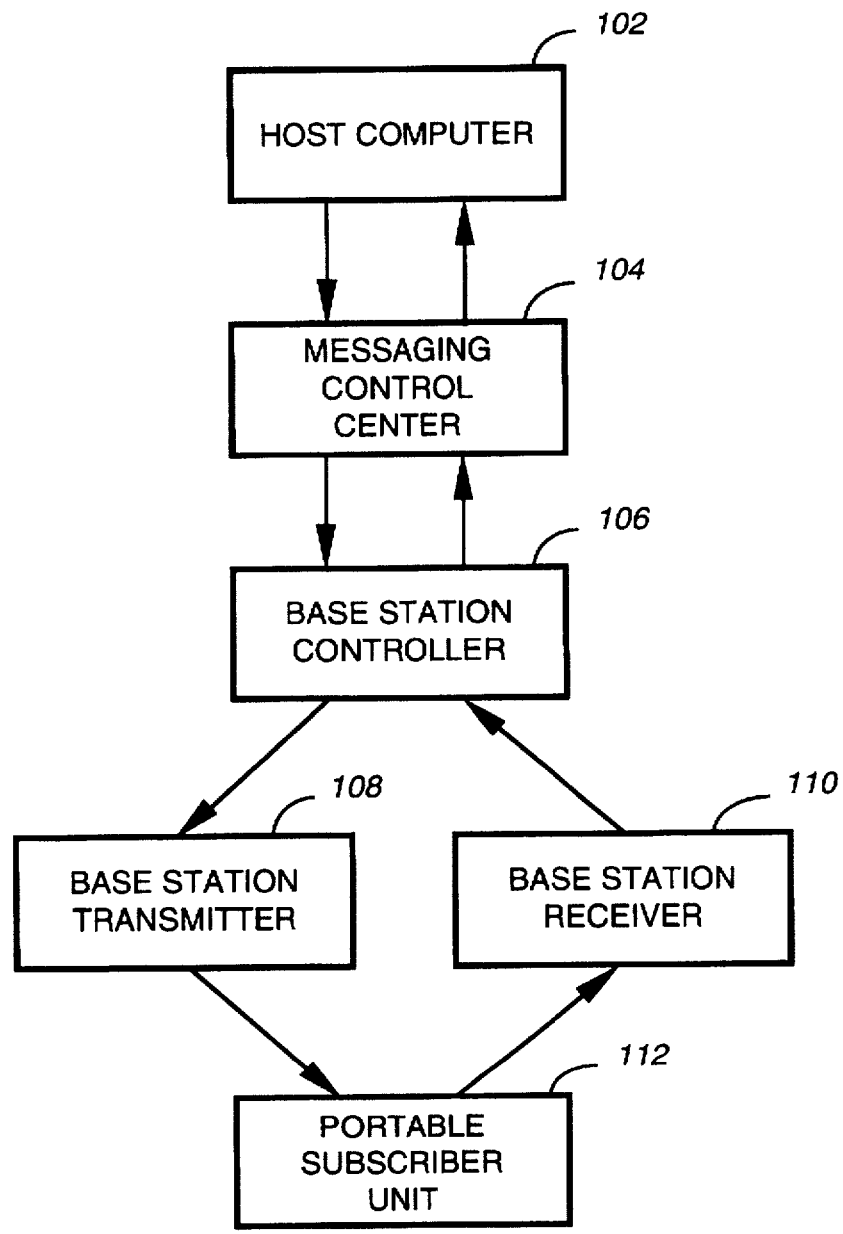
FIG. 1 is an electrical block diagram of a prior art two-way messaging system.

Referring to FIG. 1, an electrical block diagram depicts a prior art two-way messaging system 100 comprising a conventional host computer 102 for executing a plurality of applications that may be requested by a portable subscriber unit 112. The system 100 further comprises a messaging control center 104 for accepting message originations from, for example, the public switched telephone network (not shown) and for sending the messages to one or more base station controllers 106 where they are queued for transmission by one or more base station transmitters 108 to one or more portable subscriber units 112. The portable subscriber units 112 also can transmit acknowledgments and original messages and requests that are received by one or more base station receivers 110 and then passed back through the base station controller 106 to the messaging control center 104 and the host computer 102. As explained above in the Background, substantial delays, e.g., tens of seconds or even minutes, can accumulate between a request from the portable subscriber unit 112 and the completion of a response. Such delays can prohibit applications that require multiple end-to-end interactions. An embodiment of a prior art two-way messaging system is described in U.S. Pat. No. 4,875,038 issued Oct. 17, 1989 to Siwiak et al., which is hereby incorporated herein by reference.

Figure 2:
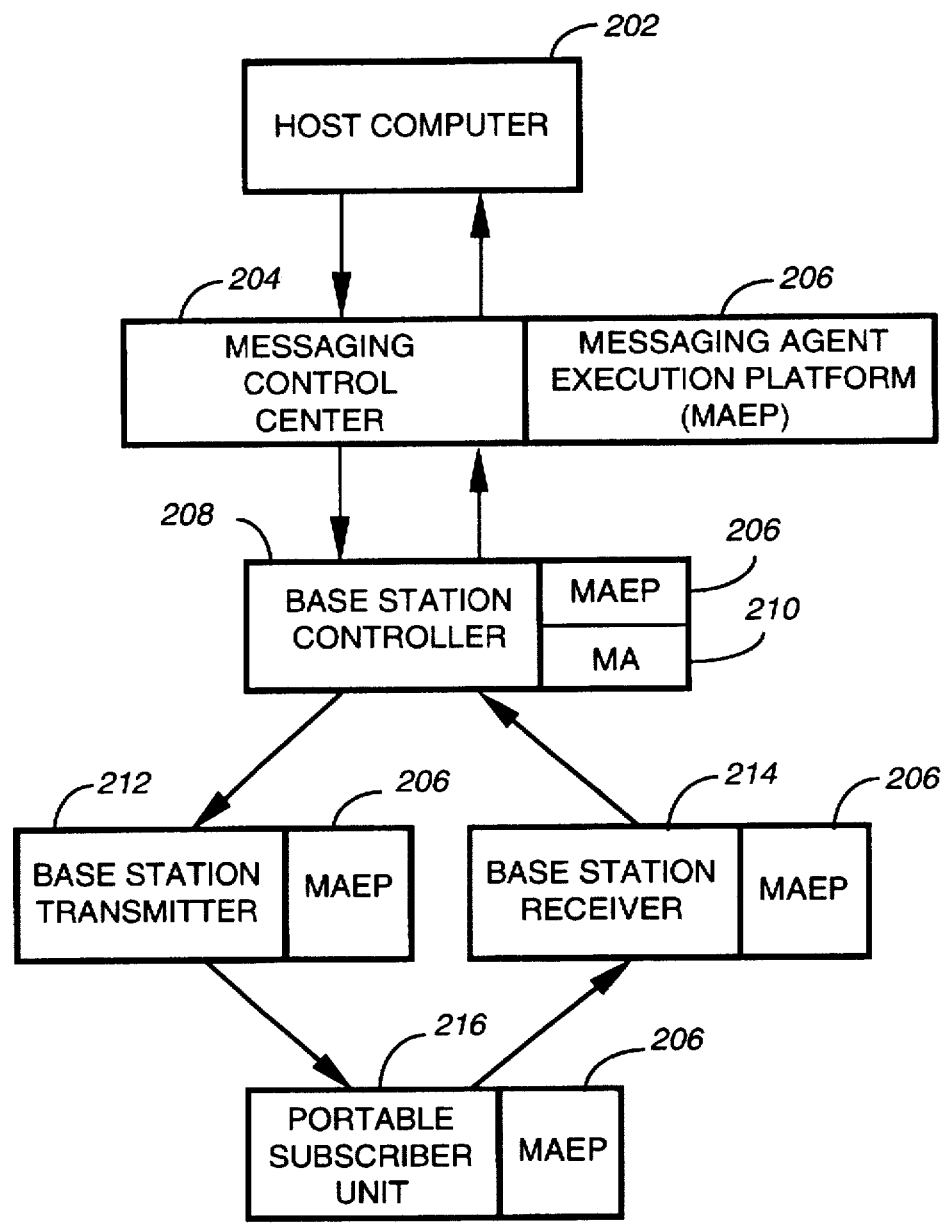
FIG. 2 is an electrical block diagram of a two-way messaging system in accordance with the preferred embodiment of the present invention.

Referring to FIG. 2, an electrical block diagram of a two-way messaging system 200 in accordance with the preferred embodiment of the present invention is depicted. The system 200 comprises a plurality of intelligent control elements, preferably including one or more conventional host computers 202, a messaging control center 204, one or more base station controllers 208, one or more base station transmitters 212, one or more base station receivers 214, and one or more portable subscriber units 216. In addition, the system 200 includes a software application interface layer comprising a messaging agent execution platform (MAEP) 206 in accordance with the present invention. The MAEP 206 enables a first one of the plurality of intelligent control elements to ship (i.e., download) a software messaging agent (MA) 210 to a second one of the plurality of intelligent control elements and to execute the MA in the second one of the plurality of intelligent control elements to reduce processing delay caused by communication latency in the system 200. The function of the MA 210 will be described further below.

The hardware of the messaging control center 204 is preferably similar to the Wireless Messaging Gateway (WMG™) Administrator! messaging control center manufactured by Motorola, Inc. of Schaumburg, Ill. The hardware of the base station controller 208 is preferably similar to the RF-Conductor!™ message distributor, also manufactured by Motorola, Inc. The base station transmitter 212 and receiver 214, respectively, are preferably similar to the Nucleus® Orchestra! transmitter and RF-Audience!™ receiver manufactured by Motorola, Inc. The portable subscriber unit 216 is preferably similar to the Tango™ subscriber unit manufactured by Motorola, Inc. It will be appreciated that other similar hardware can be utilized as well for the messaging control center 204, the base station controller 208, the base station transmitter 212, the base station receiver 214, and the portable subscriber unit 216.

Preferably, the host computer, the messaging control center 204, the base station controller 208, the base station transmitter 212, and the base station receiver 214 are coupled to one another through conventional wireline communication links and utilize conventional communication protocols for communicating with one another in a manner well known in the art. Preferably, the base station transmitter 212 and the base station receiver 214 communicate with the portable subscriber unit 216 utilizing conventional radio frequency (RF) techniques and a well-known protocol, such as a member of Motorola's FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable two-way protocols can be used as well, and that additional radio communication links can be substituted for one or more of the wireline communication links.

Figure 3:
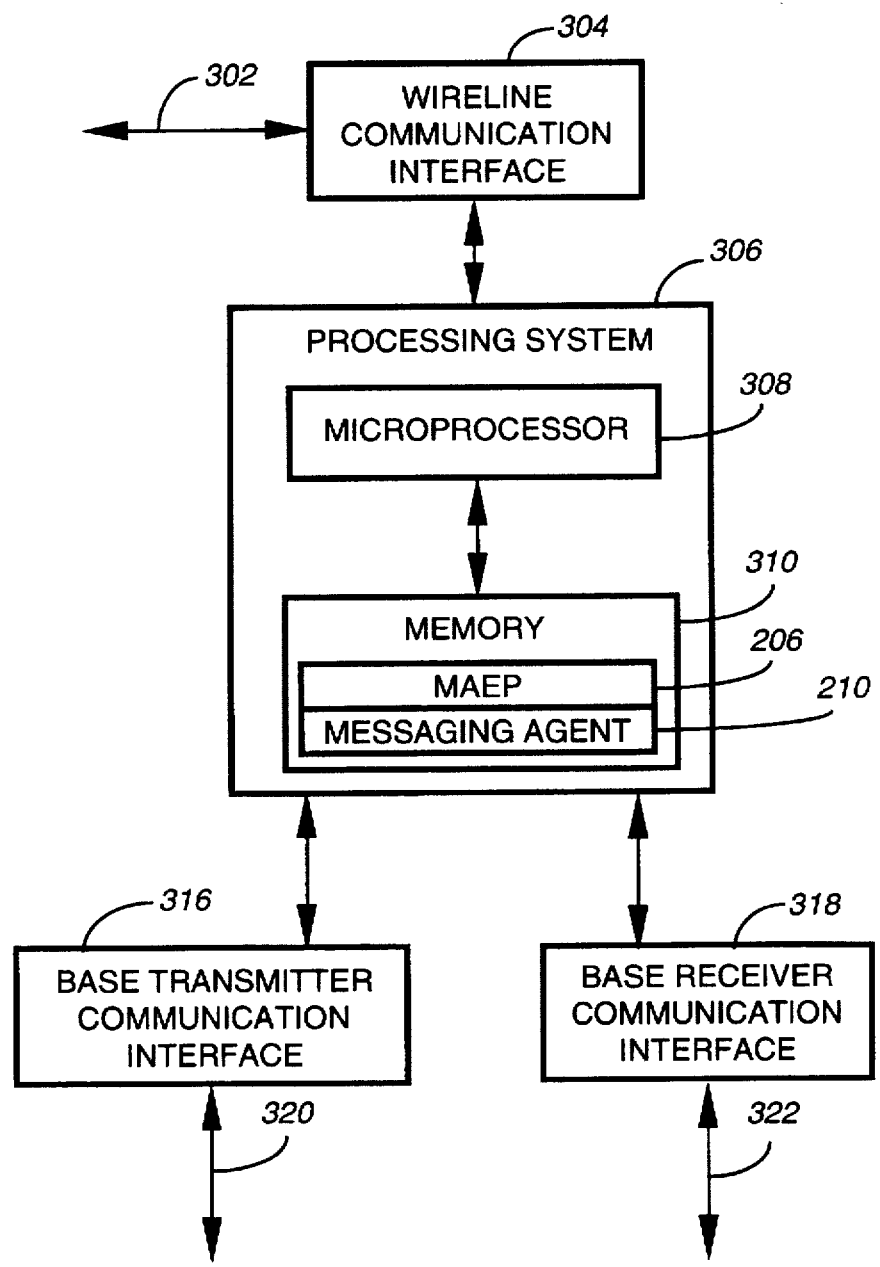
FIG. 3 is an electrical block diagram of an exemplary intelligent control element in accordance with the preferred embodiment of the present invention.

Referring to FIG. 3, an electrical block diagram depicts an exemplary intelligent control element in accordance with the preferred embodiment of the present invention. More specifically, the intelligent control element of FIG. 3 is representative of the base station controller 208. The base station controller 208 preferably comprises a conventional wireline communication interface 304 for communicating with the messaging control center 204 through a conventional wireline communication link 302. The base station controller 208 further comprises a processing system 306 coupled to the wireline communication interface 304 for directing the operations of the base station controller 208. The processing system 306 is also coupled to a base transmitter communication interface 316 and a base receiver communication interface 318 for communicating with and controlling the base station transmitter 212 and receiver 214.

The processing system 306 comprises a conventional microprocessor 308 coupled to a conventional memory 310, such as a random access memory or a magnetic disk memory. In accordance with the present invention, the memory 310 has been programmed with the software application interface layer comprising the messaging agent execution platform (MAEP) 206, which is similar to a software operating system programmed to execute a messaging agent 210. In addition, the messaging agent 210 has been shipped to the base station controller 208 and is available in the memory 310 for locally processing a portion of an interactive application. It will be appreciated that the remaining intelligent control elements of the two-way messaging system 200 are similar to the base station controller 208, the essential differences being the type of communication interfaces utilized (i.e., either wireline or radio) and the amount of memory 310 and processing power required.

A very simple example of an application for which the messaging agent 210 can reduce processing delay will now be presented. The example application is a conditional query messaging application, in which multiple-choice questions are presented by a message originator, and the message recipient responds by selecting one of the choices. A prior art conditional query system is disclosed in U.S. Pat. No. 5,153,582 issued Oct. 6, 1992 to Davis, which is hereby incorporated herein by reference.

Assume, for example, that a message originator connected to a messaging control center wants to schedule a meeting on Friday with a user of a portable subscriber unit. The originator's schedule will permit any of three meeting times. The originator wants to allow the user to choose a meeting place.

In the prior art two-way messaging system 100 the message transactions that would occur between the messaging control center (MCC) 104 and the portable subscriber unit (PSU) 112 are as follows:

MCC to PSU: Can you meet with John M. on Friday? (yes) (no)

PSU to MCC: (Yes)

MCC to PSU: Time? (10 am) (11 am) (2 pm)

PSU to MCC: (2 pm)

MCC to PSU: Place? (Place A) (Place B)

PSU to MCC: (Place A)

Now consider the two-way messaging system 200 in accordance with the preferred embodiment of the present invention. In the system 200 the MCC 204 can send the software messaging agent 210 to the PSU 216, provided that the PSU 216 has the necessary MAEP 206 installed therein. The MA 210 is then executed in the PSU 216 by the MAEP 206. An example messaging agent structure and associated message transactions for the system 200 are shown below:

MCC to PSU: send messaging agent

{send query 1 "Can you meet with John M. on Friday? (yes) (no)"

if response is (yes) send query 2 "Time? (10 am) (11 am) (2 pm)"

send query 3 "Place? (Place A) (Place B)"

when responses received return to sender with normal priority else return (no) to sender with high priority}

PSU to MCC: send response

Note that in the prior art system 100 three round trip message transactions are required, while in the system 200 in accordance with the preferred embodiment of the present invention only a single round-trip message transaction is required. Thus, the system 200 advantageously reduces processing delay by eliminating two round-trip communications and the inherent communication latency associated therewith.

The thoughtful reader will recognize that the message originator has to contribute the questions and the choices carried in the messaging agent. Preferably, the message originator does this by filling in a pre-programmed generic meeting scheduler form presented on a screen of a conventional keyboard/display device using techniques well known in the art. It will be appreciated that, alternatively, other methods, e.g. an audible interview with voice or tone-dialed responses, can be used for obtaining the required information from the message originator. It will be appreciated that many other examples of messaging agents can be given. These include MAs 210 for automatic information access, limit-triggered stock quotation delivery, and time-triggered information delivery, to name a few.

Figure 4:
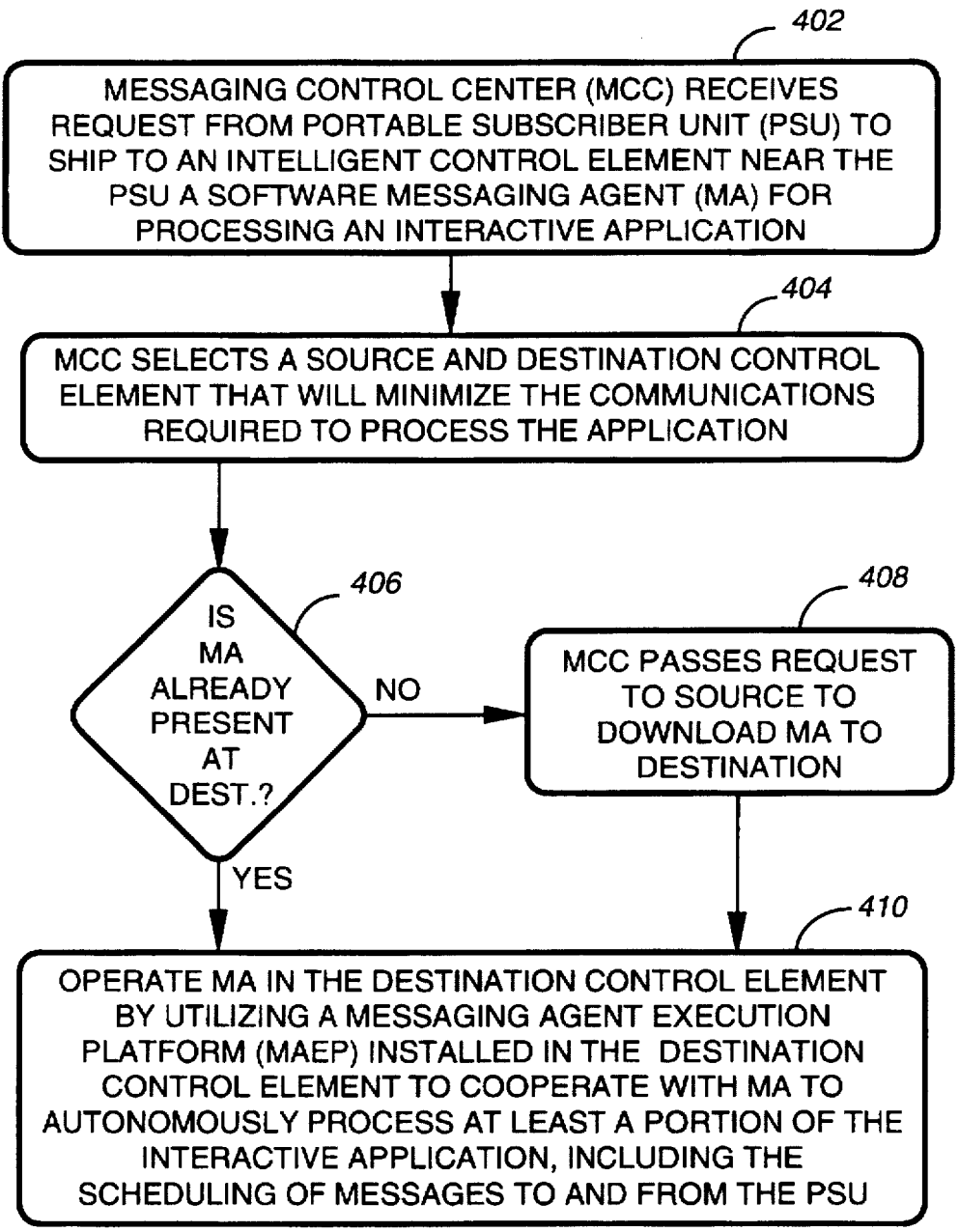
FIG. 4 is a flow chart depicting a first exemplary operation of the two-way messaging system in accordance with the preferred embodiment of the present invention.

Referring to FIG. 4, a flow chart 400 depicts an exemplary first operation of the two-way messaging system 200 in accordance with the preferred embodiment of the present invention. The flow chart 400 begins with the messaging control center (MCC) 204 receiving 402 a request from the portable subscriber unit (PSU) 216 to ship to an intelligent control element near the PSU 216 a software messaging agent (MA) 210 for processing an interactive application. In response, the MCC 204 selects 404 source and destination control elements that will minimize the communications required to process the application. For example, the MCC 204 can be pre-programmed with a list of applications and appropriate sources for each application, and can be further pre-programmed to send the MA 210 for the application to the base station controller 208 which processed the request from the PSU 216. It will be appreciated that, alternatively, other similar techniques can be utilized to select the source and destination control elements, and that others of the intelligent control elements different from the MCC 204 also can make the selection.

After the source and destination have been selected, the MCC 204 checks 406 its internal memory (not shown) to determine whether the requested MA 210 is already present at the destination. (Some frequently used MAs 210, when appropriate for the function to be performed, can be downloaded to selected ones of the intelligent control elements, where the MAs 210 remain on a long-term basis to further reduce communication delay.) If the requested MA 210 is not present, the MCC 204 passes 408 a request to the selected source to download the MA 210 to the destination element using techniques well known in the art. The selected source is preferably the host computer 202. It will be appreciated that the selected source also can be the MCC 204 itself. In any event, the MA 210 then operates 410 in the destination control element by utilizing the messaging agent execution platform (MAEP) 206 which has been installed in the destination control element to cooperate with the MA 210 to autonomously process at least a portion of the interactive application. The MA210 can include a scheduling entity that schedules messages to and from the PSU 216 or to and from a user of the PSU 216, as described in the conditional query messaging application example herein above.

Figure 5:
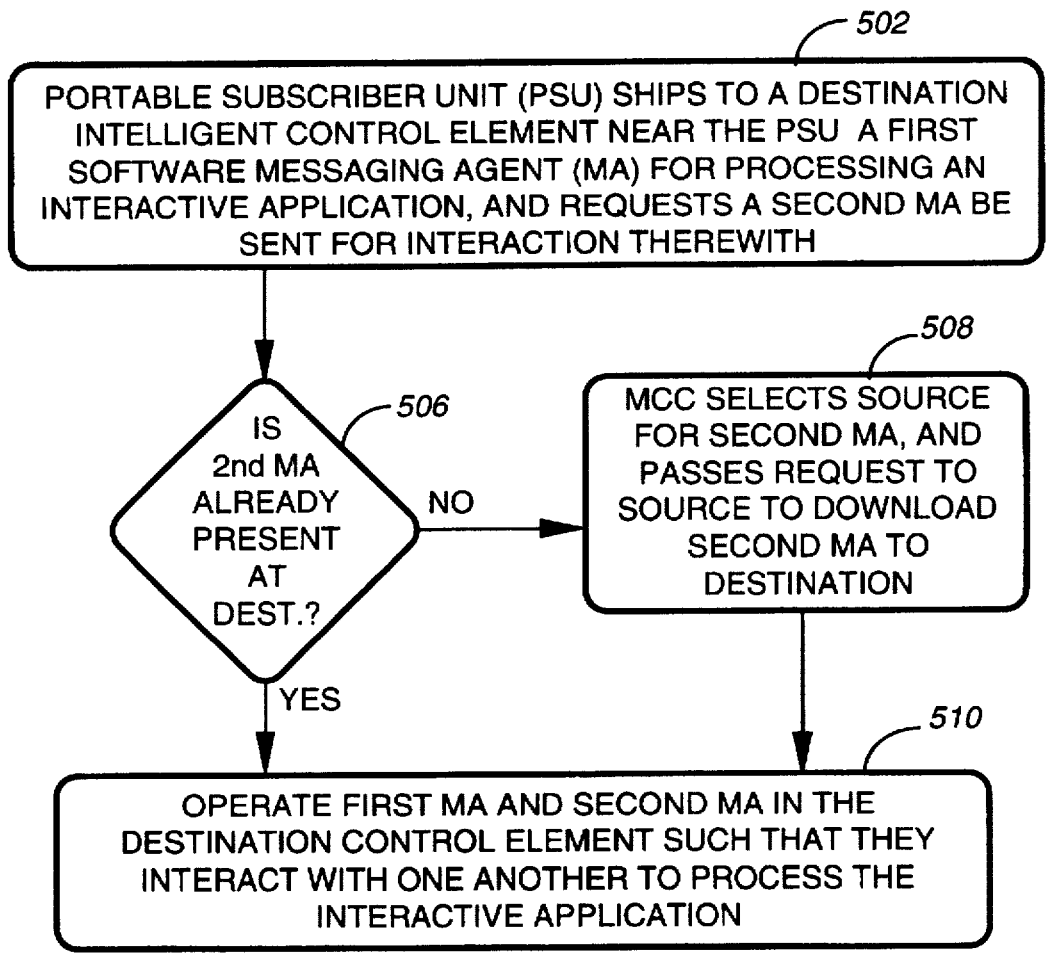
FIG. 5 is a flow chart depicting a second exemplary operation of the two-way messaging system in accordance with the preferred embodiment of the present invention.

Referring to FIG. 5, a flow chart 500 depicts an exemplary second operation of the two-way messaging system 200 in accordance with the preferred embodiment of the present invention. The flow chart 500 begins with the PSU 216 (or first control element) shipping 502 a first MA 210 to a destination (or second) control element near the PSU 216 for processing an interactive application and further requesting that a second MA 210 be sent (from a third control element) for interacting with the first MA 210 to reduce processing delay due to communication latency between the first and third control elements. In response, the MCC 204 checks 506 whether the second MA 210 is already present at the destination control element. If not, the MCC 204 selects 508 a source control element for obtaining the second MA 210, and then passes a request to the source to download the second MA 210 to the destination control element using techniques well known in the art. In any event, the first and second MA then operate in the destination control element such that they interact with one another to process at least a portion of the interactive application. The destination control element is preferably one of the base station controller.

While the foregoing description represents exemplary embodiments and operations in accordance with the present invention, it will occur to one of ordinary skill in the art that various changes and modifications can be made. For example, many different combinations of source and destination control elements utilizing single or plural MAs 210 can be made. Accordingly, the scope of the invention is delimited only in accordance with the following claims.

Thus, it should be apparent by now that the present invention provides a method and apparatus that advantageously reduces the round-trip communication delays inherent in prior art two-way messaging systems. The present invention provides an arrangement that is sufficiently fast to allow applications that require multiple end-to-end interactions to be processed without objectionable delay due to communication latency.

What is claimed is:

1. A method of reducing a delay in processing an interactive application for a portable subscriber unit in a two-way radio messaging system having a distributed architecture utilizing a plurality of intelligent control elements including a messaging control center, the method comprising the steps of:

sending a request, from the portable subscriber unit to the messaging control center, to ship a software messaging agent to one of the plurality of intelligent control elements near the portable subscriber unit for processing an interactive application;

selecting, by the messaging control center, a source and a destination control element that will minimize communications required to process the interactive application;

passing, by the messaging control center, the request to the source to download the messaging agent to the destination control element; and operating the messaging agent in the destination control element to autonomously process at least a portion of the interactive application, thereby reducing processing delay resulting from communication latency.

2. The method of claim 1, wherein the operating step includes the step of scheduling messages to and from the portable subscriber unit.

3. The method of claim 1, wherein the operating step includes the step of utilizing a messaging agent execution platform installed in the destination control element for cooperating with the messaging agent to process the portion of the interactive application.

4. The method of claim 1, further comprising in the messaging control center the steps of:

checking, before executing the passing step, whether the messaging agent is already present at the destination control element; and skipping the passing step in response to determining in the checking step that the messaging agent is already present at the destination control element.

5. The method of claim 1, wherein the selecting step comprises the step of selecting the messaging control center itself as the source, and wherein the passing step is skipped, as being unnecessary.

6. The method of claim 1, wherein the selecting step is performed by another of the plurality of intelligent control elements instead of by the messaging control center.

7. The method of claim 1, further comprising the step of downloading, by the source, a frequently used messaging agent to selected ones of the plurality of intelligent control elements, where the messaging agent remains on a long-term basis.

8. A method of reducing a delay in processing an interactive application for a portable subscriber unit in a two-way radio messaging system having a distributed architecture utilizing a plurality of intelligent control elements including a messaging control center, the method comprising the steps of:

shipping, by the portable subscriber unit, a first software messaging agent to a destination control element near the portable subscriber unit for processing an interactive application;

sending a request, from the portable subscriber unit to the messaging control center, to ship a second software messaging agent to the destination control element for interaction with the first messaging agent;

selecting, by the messaging control center, a source for the second messaging agent;

passing, by the messaging control center, the request to the source to download the second messaging agent to the destination control element; and operating the first and second messaging agents in the destination control element such that they interact with one another to process at least a portion of the interactive application, thereby reducing processing delay resulting from communication latency.

9. A two-way radio messaging system for reducing a delay in processing an interactive application for a portable subscriber unit, the system having a distributed architecture, the system comprising:

a plurality of intelligent control elements, comprising:

a messaging control center for controlling the two-way radio messaging system;

a base station controller coupled to the messaging control center for controlling a base station;

a base station transmitter coupled to the base station controller for transmitting a message to the portable subscriber unit;

a base station receiver coupled to the base station controller for receiving a message from the portable subscriber unit; and the portable subscriber unit coupled by radio to the base station transmitter and receiver for communicating therewith, wherein the portable subscriber unit is programmed to send a request to the messaging control center to ship a software messaging agent to one of the plurality of intelligent control elements near the portable subscriber unit for processing an interactive application, and wherein the messaging control center is programmed to:

select a source and a destination control element that will minimize communications required to process the interactive application; and pass the request to the source to download the messaging agent to the destination control element, and wherein the destination control element is programmed to operate the messaging agent to autonomously process at least a portion of the interactive application, thereby reducing processing delay resulting from communication latency.

10. The two-way radio messaging system of claim 9, further comprising a host computer coupled to the messaging control center for sending the software messaging agent thereto.

11. The two-way radio messaging system of claim 9, wherein the destination control element is further programmed to schedule messages to and from the portable subscriber unit.

12. The two-way radio messaging system of claim 9, wherein the destination control element comprises a messaging agent execution platform for cooperating with the messaging agent to process the portion of the interactive application.

13. The two-way radio messaging system of claim 9, wherein the messaging control center is further programmed to:

check whether the messaging agent is already present at the destination control element; and skip passing the request to the source in response to determining that the messaging agent is already present at the destination control element.

14. The two-way radio messaging system of claim 9, wherein the messaging control center, when it has the messaging agent stored within itself, is further programmed to:

select itself as the source of the messaging agent; and skip passing the request to the source to download the messaging agent.

15. The two-way radio messaging system of claim 9, wherein another one of the plurality of intelligent control elements different from the messaging control center is programmed to select the source and the destination control element.

16. The two-way radio messaging system of claim 9, wherein the source is programmed to download a frequently used messaging agent to selected ones of the plurality of intelligent control elements, where the messaging agent is intended to remain on a long-term basis.

17. The two-way radio messaging system of claim 9, wherein the portable subscriber unit is further programmed to:

select the destination control element;

ship a first software messaging agent to the destination control element for processing the interactive application; and send the request to ship a second software messaging agent to the destination control element for interaction with the first messaging agent, and wherein the destination control element is further programmed to operate the first and second messaging agents such that they interact with one another to process at least the portion of the interactive application.

* * * * *